March 11, 1952 V. B. TERHUNE 2,588,590
TROLLEY POLE
Filed Nov. 9, 1949 3 Sheets-Sheet 1
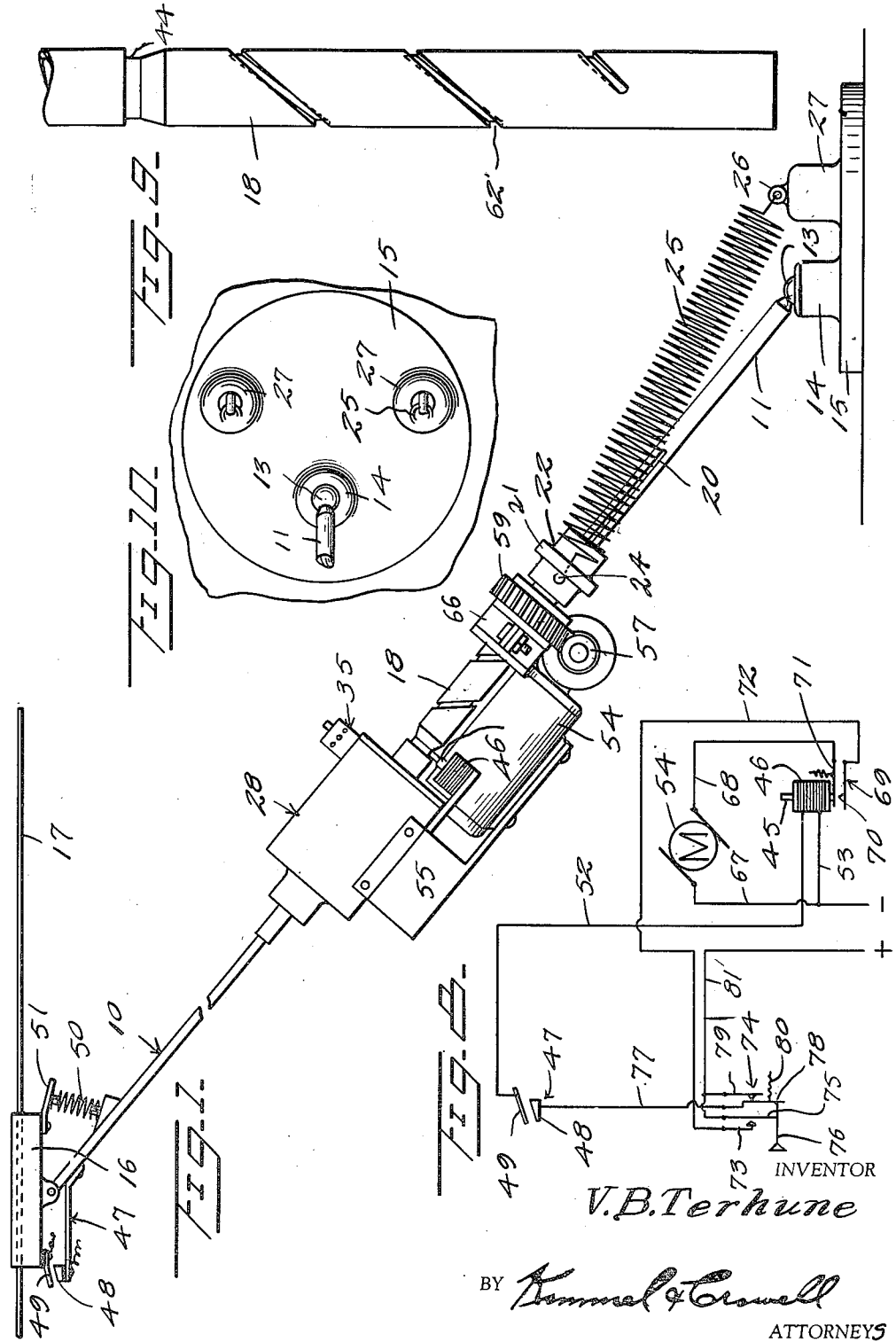
INVENTOR
V. B. Terhune
BY Kommel & Crowell
ATTORNEYS March 11, 1952  V. B. TERHUNE  2,588,590
TROLLEY POLE
Filed Nov. 9, 1949  3 Sheets-Sheet 2
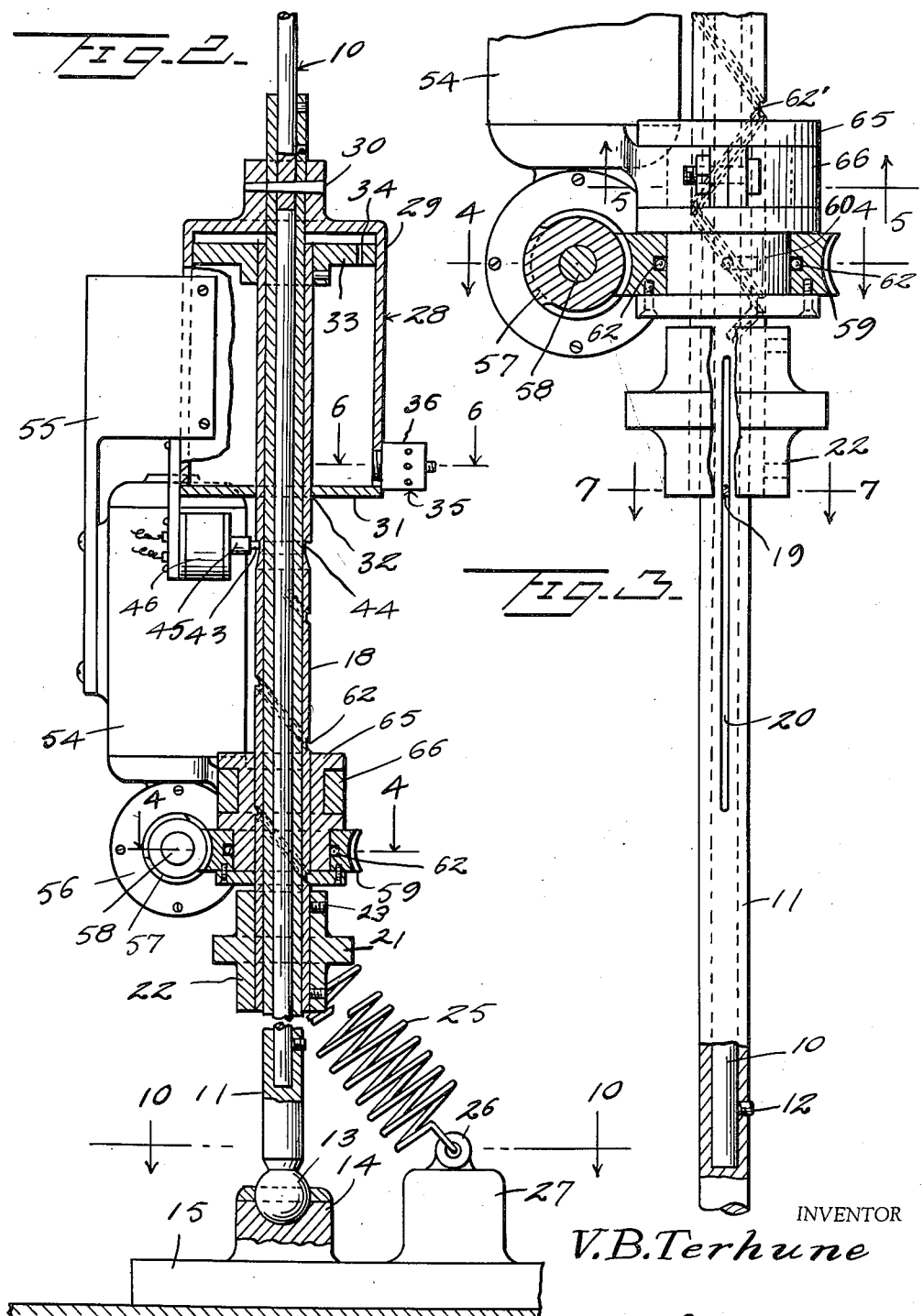
INVENTOR
V. B. Terhune
BY Kimmel & Crowell
ATTORNEYS March 11, 1952 V. B. TERHUNE 2,588,590
TROLLEY POLE
Filed Nov. 9, 1949 3 Sheets-Sheet 3
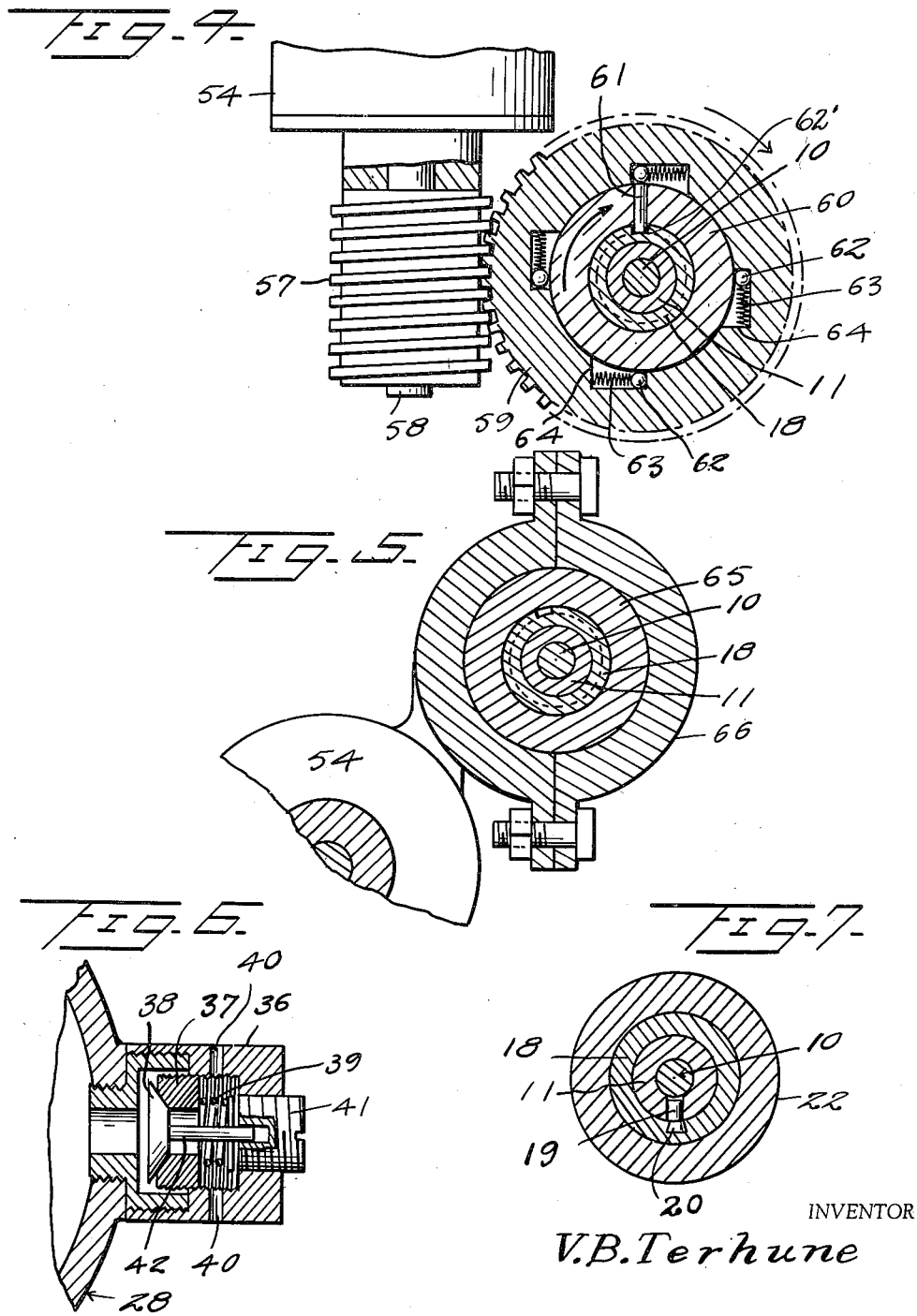
INVENTOR
V.B. Terhune
BY Kimmel & Crowell
ATTORNEYS Patented Mar. 11, 1952

2,588,590

UNITED STATES PATENT OFFICE 2,588,590

TROLLEY POLE

Vernon B. Terhune, Atlanta, Ga., assignor to Electric Trolley Pole Company, Atlanta, Ga., a partnership Application November 9, 1949, Serial No. 126,323

6 Claims. (Cl. 191—86)

1

This invention relates to trolley poles for street cars or trolley busses.

In trackless trolleys and street cars using overhead trolley wires, when the trolley pole becomes disengaged from the wire or wires, the trolley pole usually snaps upwardly to substantially a vertical position with the result that before the car can be stopped the trolley pole strikes a number of suspension wires and frequently breaks such wires. It is, therefore, an object of this invention to provide an automatically operable means which will release the trolley pole from the normal spring tension so that the pole will gravitatingly drop downwardly to an out-of-the-way position immediately the pole runs off of the trolley wire or wires.

Another object of this invention is to provide a means whereby the trolley pole may be reset or returned to its normal spring tensioned position by electrically operated means.

With the above and other objects in view, my invention consists in the arrangement, combination and details of constuction disclosed in the drawings and specification, and then more particularly pointed out in the appended claims.

In the drawings,

Figure 1 is a detail side elevation partly broken away, of a trolley pole constructed according to an embodiment of this invention, Figure 2 is a fragmentary longitudinal section of the trolley pole, Figure 3 is a fragmentary side elevation of the lower portion of the trolley pole, Figure 4 is a sectional view taken on either line 4—4 of Figure 3 or line 4—4 of Figure 2, Figure 5 is a fragmentary sectional view taken on the line 5—5 of Figure 3, Figure 6 is a fragmentary sectional view taken on the line 6—6 of Figure 2, Figure 7 is a sectional view taken on the line 7—7 of Figure 3.

Figure 8 is a schematic view showing the electric circuits embodied in this invention.

Figure 9 is a side elevation of the spring tensioning slide.

Figure 10 is a fragmentary sectional view taken on the line 10—10 of Figure 2.

Referring to the drawings, the numeral 10 designates generally an elongated pole which is disposed in the tubular member 11, being secured therein by fastening means 12 (see Figure 3). The lower end of the tubular member 11 is formed with a ball 13 engaging in a ball socket 14 which is carried by a base plate 15 adapted to be mounted on top of a bus or other electric vehicle.

2

The device herein disclosed is designed for mounting on what is known as a trolley bus of the trackless type, which obtains power through overhead wires without the use of tracks. The upper end of the pole 10 has pivotally secured thereto a shoe 16 which is adapted to engage overhead wires 17 for communicating current from the wires 17 to the electric motors.

In order to provide a means whereby the trolley pole which is normally biased upwardly to a substantially vertical position so as to thereby maintain the shoe 16 in sliding contact with the wires 17, I have provided a pole tension release means as will be hereinafter described. The tubular member 11 has slidable thereon a sleeve or tube 18 which is held against rotation relative to the tubular member 11 by means of a key 19 engaging in a keyway 20 formed in the tubular member 11 (see Figures 3 and 7). The sleeve 18 has fixed thereto a crosshead 21 which includes a bushing 22 secured by fastening means 23 (see Figure 2) to the sleeve 18 and also includes a pair of oppositely extending studs 24 (see Figure 1).

A pair of springs 25 are connected at their upper ends to the studs 24 and are connected at their lower ends to bearing members 26 which are carried by upwardly projecting bodies 27 carried by the base 15. The springs 25 will normally urge the pole 10 to assume a vertical position so that the shoe to be hereinafter described will be constantly held in engagement with the wires 17.

In order to provide a means whereby the pole 10 will be held against upward swinging when the shoe 16 rides off of the wires 17 so that any cross wires which support the trolley wires 17 will not be struck by the pole 10 or the shoe 16, I have provided a spring releasing means. The spring releasing means includes a dashpot structure 28. A cylinder 29 is secured to the pole 10, engaging about the tubular member 11 and secured to the pole and the tubular member by fastening means 30. The cylinder 29 has a lower head 31 formed with a central opening 32 through which the sleeve 18 slidably and rotatably moves.

A piston 33 is fixed to the upper end of the sleeve 18 within the cylinder 29 and is formed with one or more bleed openings 34. An air relief or intake valve generally designated as 35 is carried by the lower end of the cylinder 29 and includes a housing 36 which is formed on the inside thereof with a valve seat 37. A spring-pressed poppet valve 38 is adapted to be normally engaged with the seat 37 by means of a spring 39.

The housing 36 is formed with air intake openings 40 outwardly from the valve 38 so that air can readily be drawn into the cylinder 29 when the piston 33 moves upwardly in the cylinder. A threaded plug 41 is carried by the housing 36 and forms a guide for the stem 42 of the valve 38. The sleeve 18 is releasably latched with the piston 33 in an uppermost spring tensioning position, by means of a latch member 43 which is engageable in an annular keeper 44 formed in the sleeve 18. The latch member or bolt 43 is fixed to the core 45 of a solenoid 46, and the core 45 is normally spring-pressed to a latching position. At the time the shoe 16 becomes disengaged from the trolley wires 17, the solenoid 46 is adapted to be instantly energized by means of a switch 47 which is carried by the upper end of the pole 10.

The switch 47 includes a stationary contact 48 which is fixed relative to the pole 10 and a movable contact 49 which is fixed to the shoe 16. An expansion spring 50 is disposed between the pole 10 and an arm 51 which extends from the shoe 16 so that the shoe will be rocked upwardly at its forward end as soon as the shoe 16 is disengaged from the trolley wires 17. The movable contact 49 of switch 47 is connected by means of conductor 52 to one end of the solenoid 46 and the opposite end of solenoid 46 is connected by means of a conductor 53 to a source of electric current supply which is independent from the current supplied through the wires 17.

In order to provide a means whereby the springs 25 may be retensioned after release of the tension thereof, I have provided an electric motor 54 which is carried by a bracket 55 fixed to the dashpot 28. The motor 54 includes a reduction gearing 56 of conventional type such as worm and worm gear, and a worm 57 is secured to the gearing shaft 58. The worm 57 meshes with a worm gear 59 which is clutched to a ring or annulus 60 positioned about the sleeve 18. The ring or annulus 60 has mounted therethrough a key pin 61 which engages in a spiral or grooved keyway 62' formed in the sleeve 18. The connection between the worm gear 59 and the ring or annulus 60 is formed by means of over-riding clutch balls 62 disposed in openings 63 formed in the gear 59. The balls 62 are constantly urged to clutching position by means of springs 64. The one-way or over-riding clutch structure provides a means whereby the annulus 60 may rotate relative to the worm gear 59 in one direction without rotation of the worm gear, but when it is desired to retension the springs 25, motor 54 is energized so that worm 57 will rotate worm gear 59 in a clockwise direction as viewed in Figure 4.

A flanged collar 65 comprising an integral portion of annulus 60 is loosely disposed about the sleeve 18 on the upper end or side of worm gear 59 and is fixed relative to the motor 54 by means of a clamping and split collar 66 which is fixed relative to the motor 54. The collar 65 is grooved, as shown in Figure 2, with the split collar 66 engaging in the groove thereof. One side of the motor 54 is connected by means of a conductor 67 to conductor 53 and the other side of motor 54 is connected by conductor 68 to a switch 69. The switch 69 includes a stationary contact 70 and a movable spring-pressed contact 71. The movable contact 71 is disposed in a position to be engaged by solenoid core 45 when the latter is moved outwardly by energization of solenoid coil 46. In this manner motor 54 cannot be operated until latch member 43 is disposed in a released position.

Contact 70 is connected by means of a conductor 72 to a stationary contact 73 carried by a compound switch 74. The switch 74 includes a movable contact member 75 which is adapted to be manually engaged with contact 73 by means of a manually operating member 76. Contact 48 of switch 47 is connected by means of a conductor 77 to a movable contact 78 formed as part of the switch 74 and contact 78 is adapted to be normally urged toward a fixed contact 79 by means of a spring 80.

Contacts 75 and 79 are connected to a common conductor 81 which is connected to the opposite side of the independent supply source for both the solenoid and the trolley operating motor.

In the use and operation of this trolley structure, the trolley pole 10 will be normally engaged with the trolley wires 17 on an angle to the vertical, as shown in Figure 1, and with both of the pole tensioning springs 25 under extreme tension. At this time switch 47 will be in open position and piston 33 will be in its uppermost position in dashpot cylinder 29. Latch member 43 will be engaged in keeper 44 so as to lock sleeve 18 against downward movement.

When shoe 16 rides off of the trolley wires 17, spring 50 will rock shoe 16 to a switch closing position to thereby close the independent electric circuit to solenoid 46. At this time core 45 will be moved outwardly or to the left, as viewed in Figure 2, releasing latch member 43 from keeper 44. Springs 25 will thereupon pull crosshead 21 with sleeve 18 downwardly so as to thereby relax both of the springs 25 and permit the trolley pole to gravitatingly swing downward to an inoperative position.

When solenoid core 45 is moved outwardly or downwardly, as viewed in Figure 8, and the core is held in its outer or downward position by engagement of latch 43 with the smooth peripheral surface of sleeve 18, switch 69 will be closed. Springs 25 may be re-tensioned by closing switch 74, operator 76 being moved to the left as viewed in Figure 8, to break the circuit formed between conductors 77 and 81 and closing the circuit formed between contacts 73 and 75 and conductors 72 and 81 to motor 54. Motor 54 will then rotate worm gear 59 and key 61 will ride in groove 62' and effect outward movement of sleeve 18. When sleeve 18 has moved outwardly to substantially the limit of its outward movement, latch 43 will engage in keeper groove 44. At this time the circuit to the motor 54 is broken by the switch 69, having the movable contact 71 moved to a disengaged position with respect to contact 70. At this time the springs 25 relax due to downward or inward movement of sleeve 18, sleeve 18 being moved linearly by means of the key pin 61 which engages in the spiral groove 62', the ratchet arrangement permitting rotation of clutch collar 60 in a clockwise direction without rotation of worm gear 59.

I do not mean to confine myself to the exact details of construction herein disclosed, but claim all variations falling within the purview of the appended claims.

What I claim is:

1. In combination a trolley structure comprising a pole member, a trolley wire shoe pivotally carried by the upper end of said pole, a base for the lower end of said pole, a helically grooved sleeve slidable on said pole, a crosshead fixed to said sleeve, springs connected between said crosshead and said base adapted to yieldably maintain said pole in an upright position while said shoe is in engagement with a trolley wire, locking means carried by said pole for locking said sleeve in an upper spring tensioning position, means connected with said shoe and said locking means for effecting release of said sleeve when said shoe is disengaged from the trolley wire, and means carried by said pole engaging said sleeve for moving the latter toward said shoe to spring tensioning position, said last mentioned means comprising a motor, a worm operable by said motor, a worm gear rotatable by said worm, an annulus mounted for rotation with said gear and a pin connecting said annulus to said groove in said sleeve for linear movement for said sleeve.

2. In combination a trolley structure comprising a pole member, a trolley wire shoe pivotally carried by the upper end of said pole, a base for the lower end of said pole, a helically grooved sleeve slidable on said pole, a crosshead fixed to said sleeve, springs connected between said crosshead and said base adapted to yieldably maintain said pole in an upright position while said shoe is in engagement with a trolley wire, locking means carried by said pole for locking said sleeve in an upper spring tensioning position, means connected with said shoe and said locking means for effecting release of said sleeve when said shoe is disengaged from the trolley wire to permit release of said spring tension by movement of said sleeve toward said base, and means carried by said pole engaging said sleeve for moving the latter toward said shoe to spring tensioning position, said last mentioned means comprising a motor, a worm operable by said motor, a worm gear rotatable by said worm, an annulus mounted for rotation with said gear, a pin connecting said annulus to said groove in said sleeve for linear movement for said sleeve, and clutch means permitting rotation of said annulus in one direction without acting on said gear when said sleeve is moved toward said base.

3. In combination, a trolley structure comprising a pole member, a trolley wire shoe pivotally carried by the upper end of said pole, a base for the lower end of said pole, a helically grooved sleeve slidable on said pole, a cross head fixed to said sleeve, springs connected between said cross head and said base, locking means carried by said pole for locking said sleeve in an upper spring tensioning position, said springs normally biasing said sleeve toward said base, means connected with said shoe and said locking means for effecting release of said sleeve when said shoe is disengaged from the trolley wire, motor actuated rotatable means having a pin engaging said helically grooved sleeve carried by said pole for moving the latter toward said shoe to spring tensioning position, and manual means for energizing said motor actuated means to raise said pole to upright position.

4. In combination, a base, a trolley pole pivotally carried by said base, a sleeve slidable on said pole, a cross head fixed on said sleeve, springs connected between said cross head and said base, electrically operated releasable retaining means carried by said pole for holding said sleeve in an outer spring tensioning position, a shoe at the upper end of said pole, electrical switch means carried by said shoe connected with said retaining means for releasing the latter when the shoe is disengaged from the trolley wire whereby said springs will be relaxed to permit said trolley pole to drop from upright position, electric motor means for moving said sleeve outwardly toward said shoe to spring tensioning position, and electrical means including a switch interconnected with said retaining means and said sleeve moving motor means for rendering the latter inoperative when said retaining means is in sleeve retaining position.

5. A trolley pole structure comprising a base, a pole pivotally carried by said base, spring means connected to said base constantly urging said pole to an upright position, a shoe carried by the upper end of said pole, means including a slidable member carried by said pole active upon disengagement of the shoe from the trolley wire for releasing the pole from the tension of said spring means to permit said pole to fall from upright position, electric motor means for moving said slide to restore the tension of said springs to return said pole to upright position, said last mentioned means including an electric motor and means connected to said electric motor and said slidable member for moving said slidable member outwardly toward said shoe, and means for locking said slidable member to said pole in its outermost position.

6. A trolley pole structure comprising a base, a pole pivotally carried by said base, a shoe engageable with a trolley wire carried by said pole, spring means connected to said base constantly urging said pole to an upright position, means active upon disengagement of the shoe from the trolley wire for releasing the pole from the tension of said spring means, releasable fixed means shiftable on said pole connected to the other end of said springs for restoring the tension of said spring means, electric motor means for moving said shiftable means whereby to increase the tension of said spring means to return said pole to upright position, and automatic operable means including a switch carried by said shoe for rendering said latter named means inoperative when said shoe re-engages said trolley wire.

VERNON B. TERHUNE.

REFERENCES CITED

The following references are of record in the file of this patent:

UNITED STATES PATENTS

| Number | Name | Date |
|---|---|---|
| 750,368 | Johnson | Jan. 26, 1904 |
| 2,253,767 | Davies | Aug. 26, 1941 |
| 2,382,751 | Szalay | Aug. 14, 1945 |